(12) United States Patent
Khatchatrian et al.

(10) Patent No.: US 6,688,960 B2
(45) Date of Patent: Feb. 10, 2004

(54) METHOD AND DEVICE FOR PREPARATION OF ALIMENTARY SOFT GRANULAR CAVIAR

(75) Inventors: Robert G. Khatchatrian, Glendale, CA (US); Asmik Aruntyunyan, Glendale, CA (US); Tigran Khatchatrian, Glendale, CA (US)

(73) Assignee: Hidden Valley, N.V. (NL)

( * ) Notice: Subject to any disclaimer, the term of this patent is extended or adjusted under 35 U.S.C. 154(b) by 0 days.

(21) Appl. No.: 10/124,020

(22) Filed: Apr. 16, 2002

(65) Prior Publication Data

US 2002/0164411 A1 Nov. 7, 2002

Related U.S. Application Data

(62) Division of application No. 09/400,405, filed on Sep. 21, 1999, now Pat. No. 6,391,367.

(51) Int. Cl.[7] ............................................. A22C 25/00
(52) U.S. Cl. ................................................... 452/110
(58) Field of Search ................................. 452/613, 135, 452/137, 157, 158

(56) References Cited

U.S. PATENT DOCUMENTS

| | | | |
|---|---|---|---|
| 3,499,379 A | | 3/1970 | Nesmeyanov et al. |
| 3,717,469 A | | 2/1973 | Slonimsky et al. |
| 3,869,976 A | | 3/1975 | Nesmeyanov et al. |
| 4,143,591 A | * | 3/1979 | Yaroshenko et al. ............ 99/483 |
| 4,362,748 A | | 12/1982 | Cox |
| 4,375,481 A | | 3/1983 | Kuwabara et al. |
| 4,874,619 A | | 10/1989 | Leonardo et al. |
| 5,215,000 A | * | 6/1993 | Desage et al. ................... 99/331 |
| 5,431,934 A | | 7/1995 | Vainerman et al. |
| 5,566,492 A | * | 10/1996 | Swenson ........................ 43/6.5 |
| 5,894,936 A | * | 4/1999 | Sanders et al. ................. 209/270 |
| 6,125,549 A | * | 10/2000 | Pikus .............................. 34/267 |
| 6,149,956 A | * | 11/2000 | Boerjan .......................... 426/231 |
| 6,328,165 B1 | * | 12/2001 | Baker et al. .................... 209/235 |
| 6,391,367 B1 | * | 5/2002 | Khatchatrian et al. ......... 426/574 |

FOREIGN PATENT DOCUMENTS

| | | |
|---|---|---|
| CH | 613097 | 9/1979 |
| CH | 623729 | 6/1981 |
| NL | 6700127 | 5/1968 |
| RU | 276725 | 8/1971 |
| RU | 1782523 | 12/1992 |
| RU | 1837801 | 8/1993 |
| RU | 2029479 | 2/1995 |
| RU | 2111682 | 5/1998 |
| RU | 2139668 | 10/1999 |
| WO | 9322940 | 11/1993 |

\* cited by examiner

*Primary Examiner*—Thomas Price
(74) *Attorney, Agent, or Firm*—Knobbe, Martens, Olson & Bear LLP

(57) ABSTRACT

An apparatus for preparing an alimentary granular soft caviar similar to black granular caviar is described. The grains of caviar are by supplying a mixture containing an albuminous colloid, water, and alimentary gelatin under pressure though gauged channels to a cavity with heated vegetable oil in its upper section, separating and washing the grains, tanning the grains in a tea extract, water washing, washing with salt solution, introducing to the product of a gustatory component and mixing the grains with vegetable oil. The apparatus includes a cavity containing the initial mixture, outlet pipes with stream-forming heads, a source of gas pressure, a cylindrical granulating cavity for forming grains of the product, a nipple for draining excess forming liquid, water jackets around the cavity and the granulating cavity, and a receptacle at the bottom of the granulating cavity for accumulation of the produced grains. The apparatus also contains a compressor supplying impulse gas into the granulating cavity through pipes located at the top of the granulating cavity oriented horizontally to the center of the granulating cavity. The top of the granulating cavity is wider than the body of the granulating cavity, in the shape of a funnel, and is enclosed by a heating unit, connected to a controller.

12 Claims, 1 Drawing Sheet

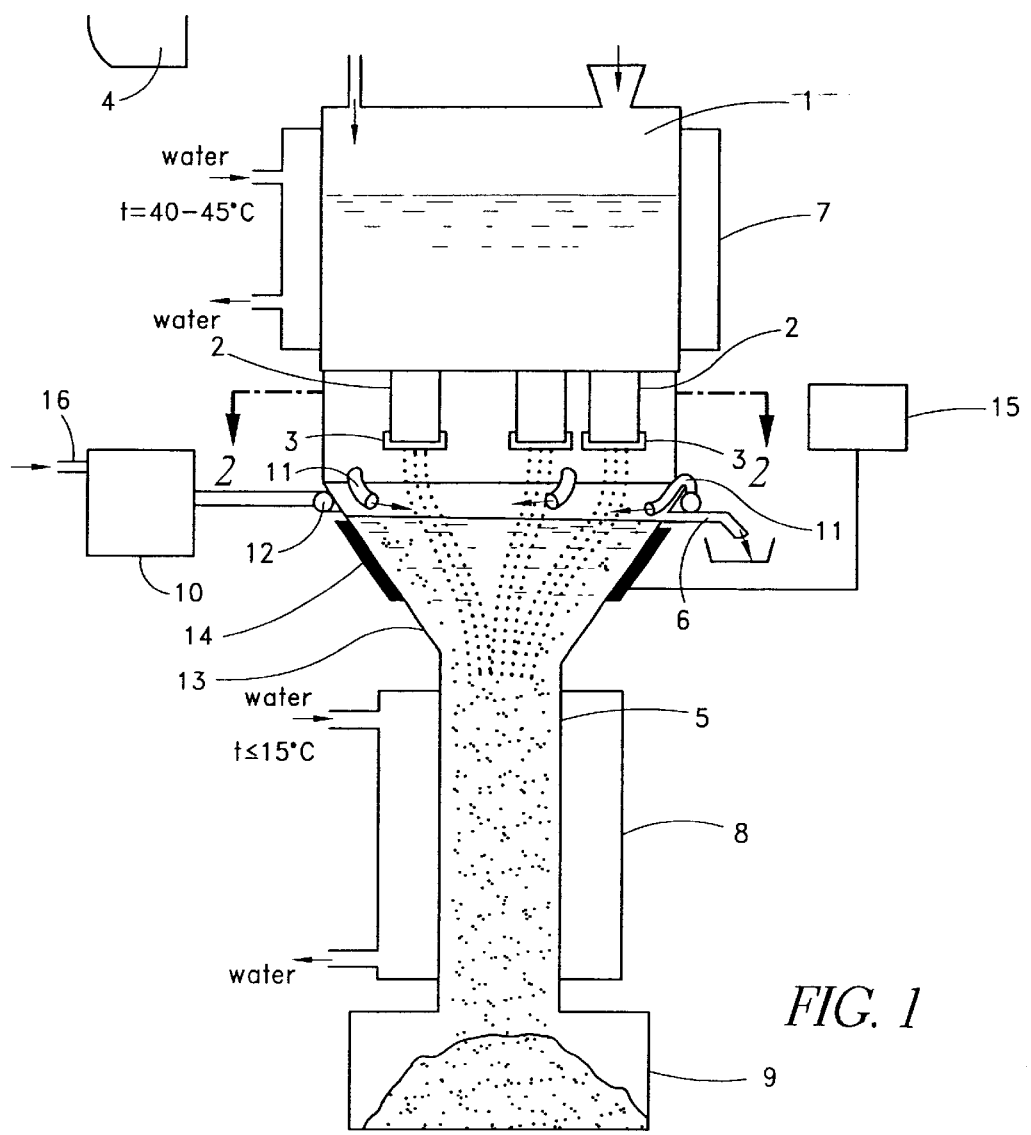
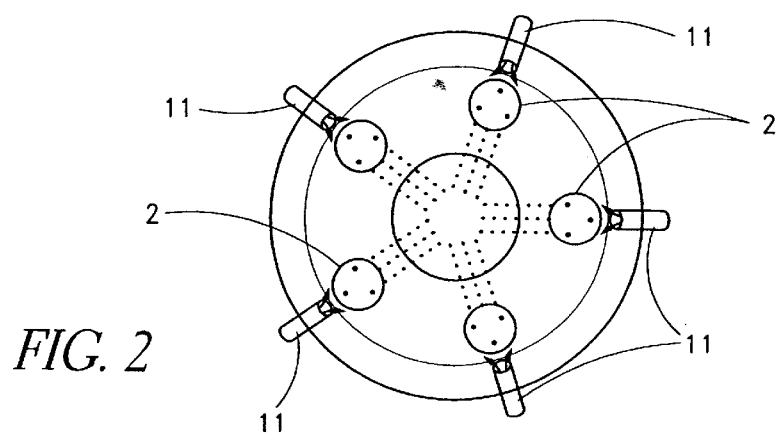

METHOD AND DEVICE FOR PREPARATION OF ALIMENTARY SOFT GRANULAR CAVIAR

CROSS-REFERENCE TO RELATED APPLICATIONS

This application is a divisional application of U.S. patent application Ser. No. 09/400,405, filed Sep. 21, 1999, now U.S. Pat No. 6,391,367.

FIELD OF THE INVENTION

The present invention is related to the technology of preparation of a delicacy granular food product, similar to black caviar, and to the device for preparing in the product. The invention can be used in the food-processing industry, in particular for preparation of dietary food.

BACKGROUND OF THE INVENTION

Methods and devices for preparation of alimentary granular caviar are known based on the technology of thermostatic control of a solution of the components of caviar, preparation of a mixture for forming the grains by pressing the components through a die under pressure into hot vegetable oil, separation of the grains from the oil, washing, drying, and subsequent processing for improvement of flavor and appearance through coloring and packing.

The method of obtaining alimentary caviar based on the preparation of a mixture containing eggs, fish homogenate, food dye, and salt, forming the grains in oil, and their culinary processing, coloring and packing is also known. The carbon medical absorbent CKT-6A is used as a dyestuff in a quantity of 4–9 weight % to the weight of the mixture for forming grains, after salt has been previously mixed with the dye-stuff (Patent of Russian Federation No. 2002432, A23L, 1/328, publication 15.11.93).

The disadvantage of the known method is that a significant quantity of grains differing from standard size are obtained, requiring sieving of the caviar, leading to reduction of the quantity of the on-the-shelf product. Further, the product has insufficient dietary and nutritional properties because of the use of eggs as one of the main components in the mixture used to form the grains. Use of a carbon medical sorbent in a quantity of nearly 9 weight % of the product limits the application of the on-the-shelf product, as it cannot be used widely as a food product: when even a single portion of 10 g caviar is eaten, a person eats 0.9 g of carbon sorbent, which corresponds to four medical tablets containing 0.25 g, the single preventive medical dose. The regular use of a carbon sorbent in such quantities is not recommended, as it is not metabolized, and it adsorbs useful compounds (hormones, vitamins) and some microorganisms.

Obtaining a delicacy granular product, similar to the caviar of sturgeon fishes, is also known, including the preparation of an albuminous mixture from eggs, gustatory components, salt and dye-stuff, forming capsules by pressing the mixture under pressure into vegetable oil heated at 82–88° C., separating the capsules from the oil, washing the emulsion and subsequently separating the capsules from the emulsion and processing the salt emulsion from the fish components and salt. An alimentary black dye-stuff, prepared from an extract of tea and $FeCl_3$ is used as coloring. The eggs are blended into the forming mixture as a mixture of the whites and yokes in a ratio of 10:1 to 4:1. A yeasty extract and alimentary fats are used for gustatory and aromatic processing. The water emulsion consisting of the egg white and salt is washed. (Patent USSR NO. 1837801, A23L, 1/328, publication 30.08.93).

The disadvantage of the method is that a significant quantity of grains deviating from standard size are obtained. It is believed that the irregularity of the grains is due to crushing at the time the grains are introduced into hot vegetable oil, when the crumbs are for some time in random (unregulated) motion at high temperature (80–90° C.), promoting change in the shape and size of the grains. Use of eggs as a base component in forming the mixture is a negative factor in the nutritional properties of the product. Use of $FeCl_3$ as a dye-stuff also reduces the organoleptic properties of the product.

Methods of forming grains and a device for obtaining alimentary granular caviar are known based on the technology of preparing a mixture containing eggs, fish homogenate, food dye-stuff and salt, supplying gauged jets of the product into vegetable oil at a temperature of 86–90° C., separating the grains from the oil, flushing with water, processing the gustatory emulsion, coloring, and subsequent packing of the on-the-shelf product. Alimentary black dye-stuff obtained from an extract of tea and $FeCl_3$ at pH 1.8–2.2 is used as coloring. The device for implementation of the method includes a cavity for initial dissolution of the components, outlet tubes with forming heads at the ends, a source of gas pressure connected to the cavity when the components are dissolved, a cylindrical granulating cavity for formation of grains of caviar, a nipple for draining excess liquid installed axially to the cavity for initial dissolution of components in front of the outlet pipes, water jackets around the cavity and the cylindrical part of granulating cavity for thermostatic control of the cavities, and a receptacle at the bottom of the granulating cavity for accumulation of the on-the shelf products (Auth. Cert. USSR No. 1782523, A23L, 1/328, publication 23.12.92).

The disadvantage of the technology is the unstable regime when forming the grains, leading to a significant amount of defective product. A device for manufacture of fish caviar was described in Japan No. 60-52795, 1985. The device consists of a unit for forming the drops of product including the droppers for feeding the special water solution (sole) and a stepped cavity with solution of gel-forming agent with an outlet aperture, where the grains of product are formed; the device is equipped with a unit for separating the grains from the forming liquid, washing, and drying. The deficiency of this device is its lower productive capacity caused by the small cross-section of the dropper channels (0.1–0.2 mm), the low output of the droppers and the low rate of feeding the special water solution to the solution of gel-forming agent.

Devices for the manufacture of imitation grain caviar are known (USSR Certificates No. 276725, 1970, No. 1732507, 1989, patent of RF No. 2029479, 1995). The deficiency of most of these devices is their low productive capacity and the unstable condition during formation of the grains, leading to defective product. In the device of the patent of RF No. 2029479, non-stable operation is caused—on the one hand—by the steady changing of pressure in the outlet apertures while the level of the solution in the cavity declines and by the various trajectories and the character of movement of the grain particles. Thus, defective product is produced in great quantities, because the upper warmed layer of forming liquid (vegetable oil) is mixed by the mechanical mixer and is intensively intermixed with the cold portion of the forming liquid without a clear boundary between the warm and cold regions, so that the process of intermixing of the forming liquid is of chaotic character.

Further, if the process of the manufacturing the caviar is performed at a temperature of +15° C. to +40° C., contact with bacterial media in the air causes contamination of the product with pathogenic microflora, leading to a limited validity period of the product.

Thus, all of the above methods and devices for preparation of alimentary granular caviar have some common disadvantages:
1. Obtaining a significant amount of grains deviating from standard size and shape, requiring sieving of the grains, reducing the useful output of the on-the-shelf product;
2. Insufficient organoleptic and nutritional properties because of the use of eggs in preparation of the caviar: the eggs may cause an alimentary allergy in some people;
3. Insufficient ecological cleanness and low-level quality of the product because of use of chemical components for coloring.

SUMMARY OF THE INVENTION

The purpose of the present method and device is the production of grains with a standard size, with limited output of defective grains, obtaining a product with higher dietary organoleptic and ecological properties, and lowering the contamination of the product by pathogenic bacteria during the production of caviar.

The purpose is achieved by using a new technology for preparation of a mixture for formation of caviar grains, which includes an albuminous colloidal solution, alimentary gelatin and water, tannic material (water extract of tea), dye-stuff, salt solution and gustatory components (for example, emulsion from fish components, salt and water). Production of caviar grains is achieved by supplying the mixture for grain formation under pressure to the cavity through gauged channels into heated vegetable oil, separation and washdown of the grains from the oil, tanning of the grains in the tea extract for a minimum of 30 minutes, rinsing with water after rinsing the grains with salt solution, introducing a gustatory component of not less than 10% of the weight of the product, mixing the caviar grains with the gustatory component (taste dressing), and packing of the on-the-shelf product.

The basic difference of the present method is the use in the colloidal solution of: soy milk, foremilk of mammals, or a mixture of these components in a ratio of 20:1 to 1:20; a mixture of cow/soy milk in the ratio of 20:1 to 1:20; or whey of soy/cow milk.

The albuminous colloidal solution is mixed with alimentary gelatin and water in a ratio of (7–10):1:(3–5). Extract from the rind of green walnuts is used as dyestuff. Processing is achieved by immersing the grains into the extract of this dye-stuff for a maximum of 3 minutes.

The mixture for formation of caviar grains additionally contains starch in the amount of 1–3 weight %.

After each rinsing, moisture is removed by processing of the grains for 15–20 minutes with air with a humidity of no more than 10 mass % at a temperature not exceeding 15° C.

Thereafter, the caviar grains are poured into the salt solution and maintained there for 15–20 minutes. The salt water is then poured off. The caviar grains are then mixed with the gustatory component (taste dressing) for a minimum of 20 minutes.

The taste dressing is prepared by cleaning salt herring of heads, tails, and bones and grinding the herring in a grinder to form a homogenate. The homogenate is centrifuged, and the liquid fraction (cod-liver oil, water, and salt) is separated from the dense fraction (sediment) to give a clear liquid, the water-oil emulsion. The water-oil emulsion is used as the taste dressing. Linseed oil can be used as an alternative taste dressing.

The product is then placed onto a sieve, and the excess taste dressing is removed over a time period of 5–10 minutes.

The device for the preparation of alimentary soft granular caviar includes a cavity with the basic solution of components introduced through output pipes with stream-forming heads at the ends; a source of gas pressure connected to the cavity; a cylindrical granulating cavity for forming the grains, piping for pouring off the excess forming liquid, installed axially to the cavity with the basic solution of components in front of the outlet pipes; thermostatic jackets around the cavity with the basic solution of components and the granulating cavity; and a receptacle for accumulation of produced grains in the lower part of the granulating cavity.

The main difference in the device from the previous devices is in providing a compressor for supplying impulse gas to the granulating cavity, where the exhaust pipes are connected to the compressor, and where the open ends of these exhaust pipes are located in the upper part of the granulating cavity in front of the outlet pipes, pointing horizontally toward the center of the granulating cavity, where the upper part of the granulating cavity has the shape of a funnel. A heating element is placed around the funnel-shaped portion of the granulating cavity, and the heating element is connected to a control unit.

The source of gas pressure contains sterile gas, for instance carbon dioxide.

The suction pipe of the compressor for the impulse supply of gas is connected to the source of the sterile gas.

The thermostatic elements for thermal control of the cavity with basic solution and of the granulating cavity are water jackets which cover the cavities.

The objects of the invention are given below in relation to the figures which reveal the basic claims of the offered invention.

BRIEF DESCRIPTION OF THE DRAWINGS

FIG. 1 is a general view of the device for manufacturing grains of caviar.

FIG. 2 is a general view of the device, section A—A.

DETAILED DESCRIPTION OF THE PREFERRED EMBODIMENT

The unit for forming of ball-shaped grains is intended for production of black caviar, for instance, for forming ball-shaped grains 1–3 mm in diameter from an albuminous mixture. The following operations—tanning, coloring, gustatory addition—may be performed in the usual utensils or special containers.

As is shown in FIG. 1, the device for manufacturing of alimentary soft caviar includes a cavity 1 for containing the basic solution of components to be supplied to the outlet pipes 2 with stream-forming heads 3 at the ends of the pipes, a source of gas pressure 4 connected to the cavity 1, a cylindrical granulating cavity 5 for the formation of caviar grains, connected to piping 6 for draining surplus formation liquid, attached axially to the cavity 1 beneath the outlet pipes 2. The cavity 1 with the basic solutions of components and the cylindrical section of the granulating cavity 5 are equipped with thermostatic means in the form of water jackets 7 and 8 located around the cavity 1 with the basic solution of components and around the cylindrical section of the granulating cavity 5. The receptacle 9 for the accumulation of the prepared grains is located in the bottom section of the granulating cavity 5. The device is also provided with a compressor 10 for supplying impulse gas into the granulating cavity 5 and with exhaust pipes 11 connected by means of pipes 12 to the compressor 10. The open ends of the exhaust pipes 11 are arranged in the upper section of the granulating cavity 5 in front of the outlet pipes 2 and oriented horizontally toward the center of the granulating cavity 5. The upper section of the granulating cavity 5 is provided with an expansion area in the form of a funnel 13 around which the heating element 14 is installed. The element 14 is controlled by the control unit 15. The source of gas pressure 4 contains sterile gas, for instance, carbon dioxide.

The suction piping 16 of the compressor 10 for the impulse gas supply is connected to the source of the sterile gas 4 (not shown in the figures).

The cavity 1 is intended for preparation of the basic albuminous mixture, for its temperature maintenance, and for the formation of streams of the albuminous mixture. The outlet pipes 2, supplied with regulating means (not shown in the figures) are made in the shape of needles with the points cut off. The regulating means (washer) is manufactured with the possibility of its moving in an axial direction, permitting the pressure and the speed of the feeding of the albuminous mixture stream passing though the calibrated 0.4 mm orifices of the stream-forming heads 3 to be changed.

The granulating cavity 5 is intended for manufacture of ball-shaped grains from the albuminous mixture and for the subsequent cooling of the grains.

The control unit 15 provides on/off switching of the heating element 14 of the granulating cavity 5 to maintain the temperature of the upper layer of the forming liquid (vegetable oil) in the range of 40–50° C.

The operating capacity of the device is up to 3.5 kg of grains per hour. The capacity may be increased by increasing the number of exhaust pipes or by geometric sizing of the device. The pressure of the air or $CO_2$ in the cavity 1 is 0.2–2.0 kg/cm$^2$. The maximum volume of albuminous mixture in the thermostat is 2.4 l. The volume of vegetable oil in the granulating cavity is 5 l. The oil type is sunflower or maize oil.

The technology of caviar manufacture begins with the preparation of the solutions for use in the manufacturing process.

Preparation of Tanning Solution.

The black tea is poured into water in a ratio of 1:15. The solution is brought to boiling over a time period of 10 minutes, the extract is cooled to room temperature, and the water is separated from the black tea. After filtration, the tanning extract is cooled to a temperature of +15° C. or lower.

Preparation of Dye-Stuff:

The rind of green walnut is added to water in a ratio of 1:5, soaked for several hours, the solution boiled for 2.5–3.0 hours, cooled, and filtered. The filtered extract is added to water in a concentration of 10 ml per 5–10 l of water, depending on the desired color intensity of the caviar grains. The dye-stuff is cooled to below 15° C.

Preparation of Vegetable Oil and Water:

The fresh vegetable oil, for instance, maize or sunflower oil, is brought to a boil, then cooled to below 15° C. The water is also boiled and cooled to 15° C. The water is used for gelatin swelling, for dye-stuff preparation, and for the final washing of the caviar grains before addition of the taste dressing.

Preparation of the Soy/Cow Milk or Foremilk:

The milk or foremilk (maximum fat level of 2.5%) is boiled and cooled to below 15° C. The foremilk is sterilized by cool sterilization (X-ray dose of 30–100 Mrad) to inactivate the foreign microflora and to maintain the immunobiological features of the product.

Preparation of the Salt Solution

The salt solution is prepared by dissolving 17–33 weight % salt in boiled water. The solution is cooled to below +15° C. The salt solution is used for additional salting of the caviar grains after dying, washing and drying.

Preparation of the Water-Oil Emulsion

Salted herring is cleaned of heads, tails, and bones and rinsed with water. Thereafter, the herring is ground in a grinder and centrifuged for 15–20 minutes at 5000 revolutions per minute. The liquid mass of the herring homogenate, consisting of cod-liver oil, water, and salt, is separated. The sediment (dense mass) is removed to give a clear liquid emulsion (a water-oil emulsion) which is used to make the taste dressing.

First Variant of the Taste Dressing

Vegetable oil and the water-oil emulsion are mixed in the following proportion (weight %)

vegetable oil—10.0–15.0 water-oil emulsion—to make 100%

Second Variant of the Taste Dressing

Linseed oil—100%

Linseed oil is a fully vegetarian gustatory component (taste dressing) having fish taste.

Operation

The operation of the device begins after the preparation of all needed dissolves, solutions, dye-stuffs, taste dressings. First, the mixture for forming the grains is prepared (Examples in Table 1). For this purpose boiled, cooled water is poured over the food gelatin or gelatin with starch, mixed and allowed to swell for 40–90 minutes. Then the albuminous colloid solution is poured into the gelatin or gelatin with starch. The albuminous colloid solution (cooled soy milk; mixture of soy milk with foremilk; foremilk; mixture of cow milk with foremilk; or whey of soy/cow milk) is poured into the gelatin or gelatin with starch and heated up to 50° C. while mixing. Then the mixture for forming the grains is poured into the cavity 1, and sterile $CO_2$ is introduced to maintain a pressure of 0.2–1.0 kg/cm$^2$ in the cavity 1.

The temperature in the cavity 1 is maintained at 40–45° C. The vegetable oil, preferably maize oil or sunflower oil, is poured into the granulating cavity 5, and the temperature maintained below 15° C. by means of water jacket 8. The upper layer of oil (in the funnel) is heated to 40–45° C., and maintained with a heating element 14, whose operation is controlled with the control unit 15. Then the compressor 10 is started, supplying the impulse stream of sterile gas at a rate of 1.0–7.0 cm/second through the exhaust pipes 11; the impulse streams are directed along the surface of the forming liquid (oil) to the center of the granulating cavity 5. After opening the valves of the outlet pipes 2, the mixture for grains formation is fed through the calibrated orifices (0.4 mm) of the heads 3 to form streams, passes through a 60–100 mm air gap, is deviated to the center of the granulating cavity 5, is crushed into drops, and is immersed in the layer of heated oil in the inlet funnel 13 of cavity 5. During this process the so-called ball clusters form grains with a diameter of 1–3 mm.

The grains are moved tangentially with impulse gas streams from the exhaust pipes 11. The size of grains is controlled by the speed of the streams of albuminous mixture and by the temperature of the heated oil layer. Overheating the oil leads to a decrease in the grain size and to an increase in the probability of the grain sticking together.

Examples of mixtures for the formation of caviar grains and the features of the produced grains are given below in Table 1.

TABLE 1

| No. of Example | Components in mixture for forming the caviar grains | Quantity, in weight % | Note |
|---|---|---|---|
| 1 | Soy milk | 61.3 | The grains keep their shape |
|   | gelatin | 7.4 | and features at temperatures |
|   | water | 31.3 | up to +20–27° C. |
| 2 | Whey of soy/cow milk | 58.0 | The grains keep their shape |
|   | gelatin | 8.0 | and features at temperatures |
|   | water | 34.0 | up to +20–27° C. |
| 3 | Soy milk | 60.4 | The grains keep their shape |
|   | gelatin | 6.2 | and features at temperatures |
|   | water | 30.4 | up to +20–27° C. |
|   | starch | 3.0 |   |
| 4 | Soy milk | 55.0 | The grains keep their shape |
|   | foremilk | 7.0 | and features at temperatures |
|   | gelatin | 6.2 | up to +20–27° C. |
|   | water | 30.8 |   |
|   | starch | 1.0 |   |
| 5 | Soy milk | 7.0 | The grains keep their shape |
|   | foremilk | 56.0 | and features at temperatures |
|   | gelatin | 6.5 | up to +20–27° C. |
|   | water | 30.5 |   |
| 6 | Cow milk | 55.0 | The grains keep their shape |
|   | soy milk | 7.0 | and features at temperatures |
|   | gelatin | 6.2 | up to +20–27° C. |
|   | water | 30.8 |   |
|   | starch | 1.0 |   |
| 7 | Cow milk | 7.0 | The grains keep their shape |
|   | soy milk | 56.0 | and features at temperatures |
|   | gelatin | 6.5 | up to +20–27° C. |
|   | water | 30.5 |   |
| 8 | Foremilk | 58.0 | The grains keep their shape |
|   | gelatin | 8.0 | and features at temperatures |
|   | water | 34.0 | up to +20–27° C. |

The rotating grains pass through a 5–7 cm thick layer of hot oil, achieving a spherical shape of almost equal size (2.5–3.5 mm), and move downward under their own weight, where they are cooled to the oil temperature (maximum 15° C.) and, after achieving a stable shape, the grains fall into the receptacle 9.

After the receptacle 9 is full of caviar grains, the grains are poured onto a sieve where the remaining oil is separated. The grains are carefully washed with a stream of cold water to remove the oil from the grains' surface. The grains remain on the sieve for 20–30 minutes, or they are dried by an air stream with a temperature of not more than 15° C. and humidity not more than 10% to remove the rest of the moisture from the surface of grains.

A total of 3 kg of product is contacted with 4 l of tea extract at 15° C. for 20–40 minutes to tan the caviar grains. The tea is poured off the grains, and the grains are washed with cool water for 5–10 min. After washing, the grains are kept on the sieve, air-dried and dyed by adding 4 l extract of the rinds of green walnut for 2–5 min. Following removal of the dye stuff, the grains acquire a dark-gray or black (with gray tinge) color. The dyed grains are washed with raw water, then with boiled water. The grains are dried with air at a temperature not over 15° C. and with a maximum humidity of 10% for 20–30 min., then poured into salt solution and maintained in the solution for 15–20 min. The salt water is poured off. Then the grains are mixed with the taste dressing (first or second variant), for a minimum of 30 min. The mixture is then placed onto the sieve, and the excessive taste liquid is poured off over 5–10 min.

Thereafter the ready product is salted, if necessary, packaged, the upper portion of the caviar is covered with vegetable oil to prevent it from drying, covered with a lid and kept at a maximum temperature of 7° C. for 5–7 days. The features of the product are given in the Table 2.

TABLE 2

Physical/Chemical And Organoleptic Features of Caviar

| Name of Feature | Characteristics of Caviar |
|---|---|
| 1. Cooking, salt, % | 3.5–4.5 |
| 2. Water, % | 30.4–34.0 |
| 3. Albuminous colloid solution % | 58.0–63.0 |
| 4. Gelatin, % | 6.2–8.0 |
| 5. Appearance | The surface of grain - equal |
| 6. Diameter of caviar grains | From 2.5 to 3.5 mm |
| 7. Color | From dark-gray to black |
| 8. Consistency and state | Grains are solid, separate from one another |
| 9. Taste and odor | Nice, with fish smell and taste |
| 10. Foreign admixtures | Absent |
| 11. Period of storage | Up to 7 days from the manufacture day at 0–7° C. |

The nutritional features of the product and its ecological purity are improved by using only natural components in the production and by adding the albuminous solution based on soy milk, foremilk, cow milk, or whey of soy/cow milk into the mixture for forming the grains. The soy milk provides an increase in the quantity of sulfur-containing amino acids (cysteine, methionine) and in the ratio of Ca ions over Na ions, leading to better energetic metabolism of the organism cells and to normalization of the cardiovascular system. The products which contain soy milk have decreased allergic reactions to humans who do not tolerate milk products due to a deficiency of lactate dehydrogenase.

The foremilk of mammals is a secretory product of mammary glands and contains dissolved or dispersed nutritive and plastic matter and a great quantity of immunoglobulins, at first secretory ones Ig A, Ig M—they provide immune protection from infections forming thereby the passive immunity.

The extract of the rind of green walnut as dye-stuff contains natural biologically active and ecologically pure components which help to extract excessive cholesterol and provide anti-sclerosis action.

The technology produces grains of caviar with optimal cohesion of grains at +20° C. in the limits of 350–370 gPA and stable at a temperature of +27° C. for at least 5 hours. Chemical reagents are not used in the described technology.

What is claimed is:

1. An apparatus for the preparation of alimentary soft granular caviar comprising:

a cavity with outlet pipes, said outlet pipes having stream-forming heads at the ends of said outlet pipes, said cavity containing a solution of a mixture for formation of caviar grains;

a source of gas pressure connected to the cavity;

a cylindrical granulating cavity beneath the heads of the outlet pipes for forming the grains from the streams from said stream forming heads; and piping in the cylindrical granulating cavity for pouring off a surplus of the solution of the mixture for formation of caviar grains, installed axially to the granulating cavity in front of the outlet pipes.

2. The apparatus of claim 1, wherein the cavity and the granulating cavity are enclosed with thermostatic jackets.

3. The apparatus of claim 2, wherein said thermostatic jackets are water jackets covering at least a portion of said cavities.

4. The apparatus of claim 1, additionally comprising a receptacle for accumulation of grains in the lower part of the granulating cavity.

5. The apparatus of claim 1, additionally comprising a compressor for supplying impulse gas into the granulating cavity through exhaust pipes connected to the compressor.

6. The apparatus of claim 5, wherein said exhaust pipes have open ends, said open ends situated in the upper part of the granulating cavity in front of the outlet pipes, said open ends pointing horizontally toward the center of the granulating cavity.

7. The apparatus of claim 5, wherein said source of gas pressure contains a sterile gas.

8. The apparatus of claim 7, wherein said sterile gas comprises carbon dioxide.

9. The apparatus of claim 7, wherein a suction pipe of said compressor for supplying impulse gas is connected to said source of gas pressure containing sterile gas.

10. The apparatus of claim 1, wherein an upper part of the granulating cavity extends from said cylindrical granulating cavity into the shape of a funnel.

11. The apparatus of claim 10, further comprising a heating element surrounding at least a portion of said upper part of the granulating cavity.

12. The apparatus of claim 11, further comprising a control unit connected to said heating element.

* * * * *